US010003965B2

(12) United States Patent
Koshimizu et al.

(10) Patent No.: US 10,003,965 B2
(45) Date of Patent: Jun. 19, 2018

(54) SUBSCRIBER PROFILE TRANSFER METHOD, SUBSCRIBER PROFILE TRANSFER SYSTEM, AND USER EQUIPMENT

(71) Applicant: NTT DOCOMO, INC., Tokyo (JP)

(72) Inventors: Takashi Koshimizu, Tokyo (JP); Hiroshi Aono, Tokyo (JP); Alf Zugenmaier, Munich (DE)

(73) Assignee: NTT DOCOMO, INC., Tokyo (JP)

( * ) Notice: Subject to any disclaimer, the term of this patent is extended or adjusted under 35 U.S.C. 154(b) by 0 days. days.

(21) Appl. No.: 14/914,814

(22) PCT Filed: Aug. 25, 2014

(86) PCT No.: PCT/JP2014/072157
§ 371 (c)(1),
(2) Date: Feb. 26, 2016

(87) PCT Pub. No.: WO2015/029945
PCT Pub. Date: Mar. 5, 2015

(65) Prior Publication Data
US 2016/0212617 A1    Jul. 21, 2016

(30) Foreign Application Priority Data
Aug. 26, 2013 (JP) .................... 2013-174622

(51) Int. Cl.
*H04M 3/16* (2006.01)
*H04W 12/04* (2009.01)
(Continued)

(52) U.S. Cl.
CPC .......... *H04W 12/04* (2013.01); *H04L 9/0844* (2013.01); *H04L 9/3213* (2013.01);
(Continued)

(58) Field of Classification Search
CPC ....... H04W 12/04; H04W 8/18; H04W 12/06; H04W 60/04; H04W 12/08; H04L 9/3213;
(Continued)

(56) References Cited

U.S. PATENT DOCUMENTS 9,603,002 B2 * 3/2017 Nishi .................... H04W 8/265
2007/0192602 A1  8/2007 Blom et al.
(Continued)

FOREIGN PATENT DOCUMENTS

JP    2004-153351 A    5/2004
JP    2013-524567 A    6/2013
(Continued)

OTHER PUBLICATIONS

Partial Supplementary European Search Report issued in the counterpart European Patent Application No. 14841096.2, dated Jan. 2, 2017 (8 pages).
(Continued)

*Primary Examiner* — Amancio Gonzalez
(74) *Attorney, Agent, or Firm* — Osha Liang LLP

(57) ABSTRACT

An eUICC 100 embedded in an UE 200 authenticates an AUTN transmitted from an HSS 300, and calculates a transfer key TK by using a secret key K. The eUICC 100 acquires a transfer Token by decoding an enc Token by using the transfer key TK, and acquires a new Customer ID by decoding an enc New ID by using the transfer key TK. The eUICC 100 transmits a user auth resp in response to a User auth+transfer Setup Req including the AUTN, the enc Token, and the enc New ID to the HSS 300. The eUICC 100 generates a shared-Secret Key shared between the eUICC 100 and an HSS 400 by using the transfer Token, and executes an attach procedure for the HSS 400 by using the generated shared-Secret Key and the new Customer ID.

9 Claims, 7 Drawing Sheets

(51) Int. Cl.
*H04L 9/08* (2006.01)
*H04L 9/32* (2006.01)
*H04W 12/08* (2009.01)
*H04W 8/18* (2009.01)
*H04W 12/06* (2009.01)
*H04W 60/04* (2009.01)

(52) U.S. Cl.
CPC .............. *H04L 9/3271* (2013.01); *H04W 8/18* (2013.01); *H04W 12/06* (2013.01); *H04W 12/08* (2013.01); *H04W 60/04* (2013.01); *H04L 2209/80* (2013.01)

(58) Field of Classification Search
CPC .. H04L 9/0844; H04L 9/3271; H04L 2209/80
USPC ........................................................ 455/411
See application file for complete search history.

(56) References Cited

U.S. PATENT DOCUMENTS

| | | | |
|---|---|---|---|
| 2011/0265158 | A1 | 10/2011 | Cha et al. |
| 2012/0173743 | A1 | 7/2012 | Yu |
| 2012/0304312 | A1 | 11/2012 | Dong |
| 2014/0140507 | A1 | 5/2014 | Park et al. |
| 2016/0295407 | A1* | 10/2016 | Hur ................... H04W 12/06 |

FOREIGN PATENT DOCUMENTS

| | | |
|---|---|---|
| WO | 2009/092115 A2 | 7/2009 |
| WO | 2012/085593 A1 | 6/2012 |
| WO | 2013/009045 A2 | 1/2013 |
| WO | 2013/075873 A1 | 5/2013 |

OTHER PUBLICATIONS

Barriga et al.; "M2M Remote-Subscription Management"; XP-002686983; May 2, 2011 (6 pages).
Rescorla RTFM Inc.; "Diffie-Hellman Key Agreement Method"; 4, Rue Des Falaises CH-1205, Geneva, Switzerland; Jun. 30, 1999 (14 pages).
International Search Report issued in PCT/JP2014/072157 dated Dec. 2, 2014 (5 pages).
Written Opinion of the International Searching Authority issued in PCT/JP2014/072157 dated Dec. 2, 2014 (5 pages).
The EXALTED Consortuim,; "WP5—Security, Authentication & Provisioning. Deliverably 5.1 Security and Provisioning Solutions"; FP7 Contract No. 258512, Feb. 24, 2012 (115 pages).
3GPP TR 33.812 V9.2.0; "3rd Generation Partnership Project; Technical Specification Group Services and System Aspects; Feasibility study on the security aspects of remote provisioning and change of subscription for Machine to Machine (M2M) equipment; (Release 9)"; Jun. 2010 (87 pages).
GSM Association; "Embedded SIM Task Force Requirements and Use Cases 1.0"; Feb. 21, 2011 (38 pages).
CSMG; "Reprogrammable SIMs; Technology, Evolution and Implications"; Sep. 25, 2012 (95 pages).
ETSI TS 103 383 V12.0.0; "Smart Cards; Embedded UICC; Requirements Specification; (Release 12)"; Feb. 2013; (19 pages).
Euchner, M..; "HMAC-Authenticated Diffie-Hellman for Multimedia Internet KEYing (MIKEY)"; RFC4650; Network Working Group, Sep. 2006, (27 pages).
Extended European Search Report issued in corresponding European Application No. 14841096.2, dated Apr. 4, 2017 (12 pages).
Office Action issued in corresponding Japanese Patent Application No. 2016-221427, dated Feb. 6, 2018 (9 pages).

* cited by examiner

SUBSCRIBER PROFILE TRANSFER METHOD, SUBSCRIBER PROFILE TRANSFER SYSTEM, AND USER EQUIPMENT

TECHNICAL FIELD

The present invention relates to a subscriber profile transfer method, a subscriber profile transfer system, and user equipment that enable a subscriber profile such as a security key and an IMSI to be securely transferred between carriers.

BACKGROUND ART

In recent years, studies of M2M (Machine-to-Machine), namely, inter-machine communications, have been underway. In the M2M, machines connected to a communication network communicate with each other without intervention of operation by human beings, thereby automatically executing appropriate machine control and the like. For example, the 3rd Generation Partnership Project (3GPP) has been promoting standardization of a M2M-related communication standard named Machine Type Communication (MTC).

In the case of M2M, introduction of an embedded Universal Integrated Circuit Card (eUICC, an embedded subscriber identification module) is expected to spread taking into consideration support of user equipments (UEs) expected to be in an enormous number, continuous provision of a service to a user even if the user changes a carrier (hereinafter referred to as operator) to which the user subscribes, and other purposes. Unlike a conventional slot-in type UICC (SIM), the eUICC is a UICC embedded in a UE beforehand, and can be remotely activated via an access means such as wireless communications to this UE (for example, Non-patent document 1). Specifically, a subscriber profile (such as an IMSI (International Mobile Subscriber Identity), and a security key for UE authentication) and the like, which are necessary in order that the UE can attach to a mobile communication network, can be remotely written to or deleted from the UE.

In addition to realize writing and deletion of necessary information such as a subscriber profile to and from the eUICC, Non-patent document 1 proposes installment of a Subscription Manager (SM) connected to a facility of each operator.

Meanwhile, the 3GPP has also been studying a method of exchanging subscriber profiles between operators, considering a case where a user changes an operator to which the user subscribes, or other similar cases (for example, Non-patent document 2).

PRIOR ART DOCUMENT

Non-Patent Document

Non-patent document 1: UICC: ETSI TS_103.383 Smart Cards; Embedded UICC; Requirements Specification v2.0.0 (2013 February), ETSI, February, 2013
Non-patent document 2: 3GPP TR33.812 V9.2.0 Security Aspects of Remote Provisioning and Change of Subscription for M2M, 3GPP, June, 2010

SUMMARY OF THE INVENTION

However, the above-described writing and deletion of information to and from the eUICC by using the Subscription Manager (SM) has the following problem. That is, a relationship between a management entity of the SM and each operator is unclear, and in introduction of the SM, there are many problems to be solved not only from technical aspects but also from management perspectives. Therefore, such writing and deletion are not practical.

Meanwhile, in the above-described method of exchanging subscriber profiles between the operators discussed in Non-patent document 2, there is no procedure for mutual authentication and secure exchange of secret keys, which should be executed before exchange of subscriber profiles between an old operator and a new operator, specifically, there is no Authentication and Key Agreement (AKA) procedure.

Therefore, it is an objective of the present invention to provide a subscriber profile transfer method, a subscriber profile transfer system, and user equipment that enable a subscriber profile and the like necessary for activation of an eUICC to be securely transferred between carriers (operators) without using a Subscription Manager (SM).

A first feature of the present invention is summarized a subscriber profile transfer method of transferring a subscriber profile associated with user equipment from a first operator to a second operator by using the user equipment, an embedded subscriber identification module that is a subscriber identification module embedded in the user equipment, a first subscriber server managed by the first operator, and a second subscriber server managed by the second operator, the method including the steps of: causing the embedded subscriber identification module to transmit a transfer request for the subscriber profile to the user equipment, the transfer request including a module transfer identifier associated with the embedded subscriber identification module, an operator-transfer temporary number associated with a transfer of the subscriber profile, a subscriber transfer identifier indicating that the transfer is authenticated by a user of the user equipment, and a new operator identifier for identifying the second operator; causing the user equipment to transmit a transfer request including a subscriber transfer identifier for identifying the second subscriber server, the subscriber transfer identifier, and the operator-transfer temporary number to the first subscriber server, and to transmit a transfer preparation command including the new operator identifier, the module transfer identifier, and the operator-transfer temporary number to the embedded subscriber identification module; causing the first subscriber server to transmit a transfer request including a subscriber identifier associated with the user equipment to the second subscriber server via a secure channel established with the second subscriber server, and to receive a response including a new subscriber identifier for identifying the user equipment in the second operator from the second subscriber server; causing the first subscriber server to generate a transfer key by using a secret key held by the first subscriber server and the embedded subscriber identification module, to generate an encoded token by encoding a transfer token that is a temporary operator for transfer by using the transfer key, to generate an encoded new identifier by encoding the new subscriber identifier by using the transfer key, to generate a message authentication code including the operator-transfer temporary number, the encoded token, and the encoded new identifier, and to transmit a user-authentication transfer-setup request including an authentication token generated using the message authentication code, the encoded token, and the encoded new identifier to the embedded subscriber identification module; causing the embedded subscriber identification module to authenticate the authentication token and calculate the transfer key, to acquire the transfer token by decoding the encoded token by using the transfer key, to acquire the new subscriber identifier by decoding the encoded new identifier by using the transfer key, and to transmit a user authentication response to the user-authentication transfer-setup request to the first subscriber server; causing the first subscriber server to transmit the transfer token to the second subscriber server via the secure channel; causing the second subscriber server to transmit a message including the new operator identifier, the new subscriber identifier, and a message authentication code including the transfer token to the embedded subscriber identification module according to a predetermined key exchange protocol; and causing each of the embedded subscriber identification module and the second subscriber server to generate a shared secret key using the transfer token, the shared secret key shared between the embedded subscriber identification module and the second subscriber server, and execute an attach procedure by using the generated shared secret key and the new subscriber identifier.

A second feature of the present invention is summarized a subscriber profile transfer system of transferring a subscriber profile associated with user equipment from a first operator to a second operator by using the user equipment, an embedded subscriber identification module that is a subscriber identification module embedded in the user equipment, a first subscriber server managed by the first operator, and a second subscriber server managed by the second operator. Here, the embedded subscriber identification module transmits a transfer request for the subscriber profile to the user equipment, the transfer request including a module transfer identifier associated with the embedded subscriber identification module, an operator-transfer temporary number associated with a transfer of the subscriber profile, a subscriber transfer identifier indicating that the transfer is authenticated by a user of the user equipment, and a new operator identifier for identifying the second operator, the user equipment transmits a transfer request including a new subscriber server identifier for identifying the second subscriber server, the subscriber transfer identifier, and the operator-transfer temporary number to the first subscriber server, and transmits a transfer preparation command including the new operator identifier, the module transfer identifier, and the operator-transfer temporary number to the embedded subscriber identification module, the first subscriber server transmits a transfer request including a subscriber identifier associated with the user equipment to the second subscriber server via a secure channel established with the second subscriber server, and receives a response including a new subscriber identifier for identifying the user equipment in the second operator from the second subscriber server, the first subscriber server generates a transfer key by using a secret key held by the first subscriber server and the embedded subscriber identification module, generates an encoded token by encoding a transfer token that is a temporary operator for transfer by using the transfer key, generates an encoded new identifier by encoding the new subscriber identifier by using the transfer key, generates a message authentication code including the operator-transfer temporary number, the encoded token, and the encoded new identifier, and transmits a user-authentication transfer-setup request including an authentication token generated using the message authentication code, the encoded token, and the encoded new identifier to the embedded subscriber identification module, the embedded subscriber identification module authenticates the authentication token and calculates the transfer key, acquires the transfer token by decoding the encoded token by using the transfer key, acquires the new subscriber identifier by decoding the encoded new identifier by using the transfer key, and transmits a user authentication response to the user-authentication transfer-setup request to the first subscriber server, the first subscriber server transmits the transfer token to the second subscriber server via the secure channel, the second subscriber server transmits a message including the new operator identifier, the new subscriber identifier, and a message authentication code including the transfer token to the embedded subscriber identification module according to a predetermined key exchange protocol, and each of the embedded subscriber identification module and the second subscriber server generates a shared secret key by using the transfer token, the shared secret key being shared between the embedded subscriber identification module and the second subscriber server, and executes an attach procedure by using the generated shared secret key and the new subscriber identifier.

A third feature of the present invention is summarized user equipment including: an embedded subscriber identification module that is a subscriber identification module of an embedded type. Here, the embedded subscriber identification module transmits a transfer request for a subscriber profile to the user equipment, the transfer request including a module transfer identifier associated with the embedded subscriber identification module, an operator-transfer temporary number associated with a transfer of the subscriber profile associated with the user equipment, a subscriber transfer identifier indicating that the transfer is authenticated by a user of the user equipment, and a new operator identifier for identifying a second operator different from a first operator, the user equipment transmits a transfer request including a new subscriber server identifier for identifying a second subscriber server managed by the second operator, the subscriber transfer identifier, and the operator-transfer temporary number to a first subscriber server managed by the first operator, and transmits a transfer preparation command including the new operator identifier, the module transfer identifier, and the operator-transfer temporary number to the embedded subscriber identification module, and the embedded subscriber identification module authenticates an authentication token transmitted from the first subscriber server managed by the first operator, and calculates a transfer key by using a secret key held by the first subscriber server and the embedded subscriber identification module, acquires a transfer token that is a temporary operator for transfer by decoding an encoded token by using the transfer key, acquires a new subscriber identifier for identifying the user equipment in the second operator by decoding an encoded new identifier by using the transfer key, transmits a user authentication response to a user-authentication transfer-setup request including the authentication token, the encoded token, and the encoded new identifier to the first subscriber server, and generates a shared secret key using the transfer token, the shared secret key shared between the embedded subscriber identification module and the second subscriber server managed by the second operator, and executes an attach procedure for the second subscriber server by using the generated shared secret key and the new subscriber identifier.

MODE FOR CARRYING OUT THE INVENTION

Next, an embodiment of the present invention will be described. Note that, in the following description of the drawings, same or similar reference signs denote same or similar elements and portions. In addition, it should be noted that the drawings are schematic and ratios of dimensions and the like are different from actual ones.

Therefore, specific dimensions and the like should be determined in consideration of the following description. Moreover, the drawings also include portions having different dimensional relationships and ratios from each other.

Figure 1:
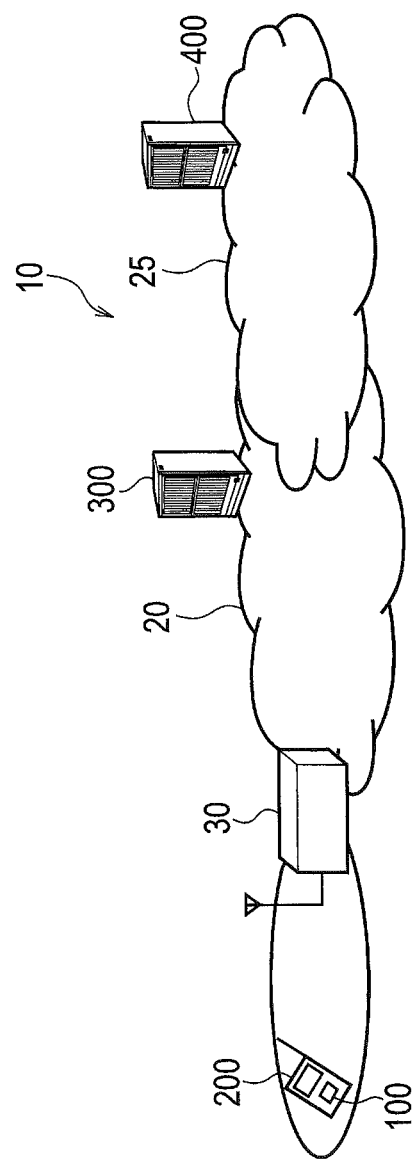
FIG. 1 is an overall schematic configuration diagram of a mobile communication system 10 according to an embodiment of the present invention.

(1) Overall Schematic Configuration of Mobile Communication System Including Subscriber Profile Transfer System FIG. 1 is an overall schematic configuration diagram of a mobile communication system 10 according to the present embodiment. As illustrated in FIG. 1, the mobile communication system 10 is a mobile communication system compliant with a communication scheme defined by the 3rd Generation Partnership Project (3GPP), specifically, 3G (W-CDMA) or Long Term Evolution (LTE). The mobile communication system 10 includes mobile communication networks 20 and 25, a radio base station 30, a user equipment 200 (hereinafter referred to as UE 200), a subscriber server 300 (hereinafter referred to as HSS 300), and a subscriber server 400 (hereinafter referred to as HSS 400).

Each of the mobile communication networks 20 and 25 is a communication network, which includes a gateway (not illustrated) to the radio base station 30 and an external network, and the like, and which is so-called a Public Land Mobile Network (PLMN). The mobile communication networks 20 and 25 are interconnected, and the HSS 300 is connected to the mobile communication network 20, whereas the HSS 400 is connected to the mobile communication network 25.

Further, in the present embodiment, the UE 200 is assumed to be a so-called MTC-UE, which is optimized to Machine Type Communication (MTC), and includes an embedded subscriber identification module 100 (hereinafter referred to as eUICC 100). Unlike a conventional slot-in type UICC (SIM), the eUICC 100 (an embedded Universal Integrated Circuit Card) is a subscriber identification module embedded in the UE 200 beforehand at the time of production.

In the present embodiment, a subscriber profile transfer system includes the eUICC 100, the UE 200, the HSS 300, and the HSS 400. The HSS 300 is a home subscriber server managed by a carrier (a first operator), and forms a first subscriber server, in the present embodiment. Further, the HSS 400 is a home subscriber server managed by a second operator, which is a carrier different from the first operator, and forms a second subscriber server, in the present embodiment.

Furthermore, in the present embodiment, the UE 200 is assumed to subscribe to a communication service provided by the first operator. The eUICC 100 stores a subscriber profile associated with the UE 200, examples of which include an IMSI (International Mobile Subscriber Identity) and a security key (a secret key) for authentication of the UE 200.

In the present embodiment, functions and operation in the following case is described. When a user (a subscription subscriber) of the UE 200 changes from a usage subscription of the communication service provided by the first operator to a usage subscription of a communication service provided by the second operator, the subscriber profile associated with the UE 200 is transferred from the first operator (specifically, the HSS 300) to the second operator (specifically, the HSS 400). In the following description, the HSS 300 is referred to as old HSS, and the HSS 400 is referred to as new HSS, as appropriate.

(2) Functional Block Configuration of Subscriber Profile Transfer System

Next, there is described a functional block configuration of each of the eUICC 100, the UE 200, the HSS 300, and the HSS 400 included in the subscriber profile transfer system in the present embodiment.

(2.1) eUICC 100

Figure 2:
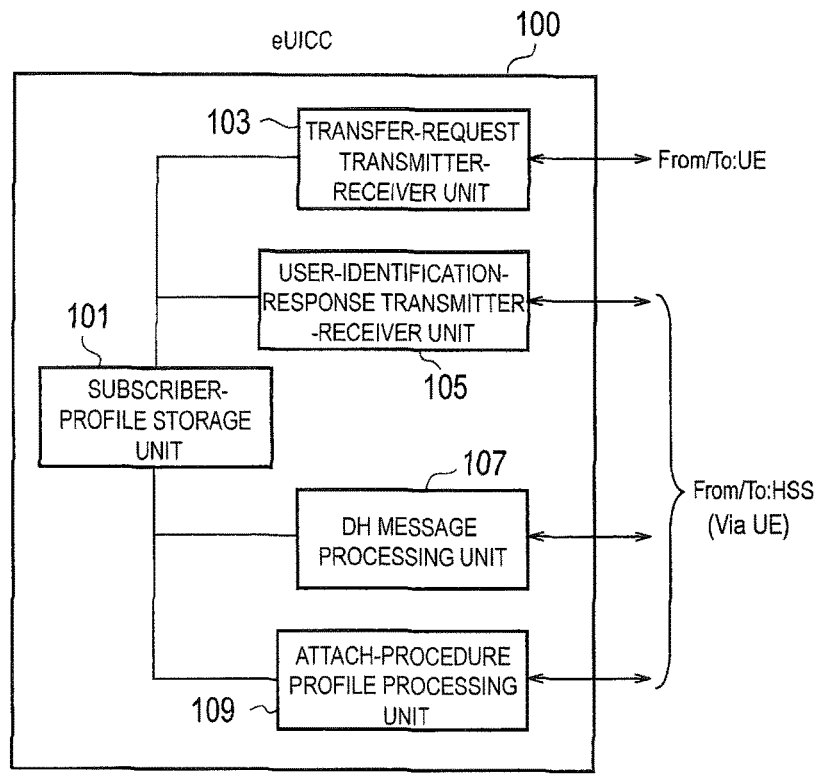
FIG. 2 is a functional block configuration diagram of an eUICC 100 according to the embodiment of the present invention.

FIG. 2 is a functional block configuration diagram of the eUICC 100. As illustrated in FIG. 2, the eUICC 100 includes a subscriber-profile storage unit 101, a transfer-request transmitter-receiver unit 103, a user-identification-response transmitter-receiver unit 105, a DH message processing unit 107, and an attach-procedure profile processing unit 109.

The subscriber-profile storage unit 101 stores the subscriber profile associated with the UE 200. Specifically, the subscriber-profile storage unit 101 stores the IMSI for identifying the user (the subscription subscriber) of the UE 200, the secret key used for purposes such as authentication of the UE 200, and the like.

The transfer-request transmitter-receiver unit 103 transmits a transfer request (a transfer Request) for a transfer of the subscriber profile from the HSS 300 to the HSS 400 to the UE 200, and receives a transfer preparation command (a transfer Prepare) from the UE 200. Specifically, the transfer-request transmitter-receiver unit 103 transmits the transfer Request including a module transfer identifier (a UICC Transfer PIN) associated with the eUICC 100, an operator-transfer temporary number (an operator Transfer Nonce) associated with the transfer of the subscriber transfer, a subscriber transfer identifier (a customer Transfer PIN) indicating that the transfer is authenticated by the user of the UE 200, and a new operator identifier (a new Operator ID) for identifying the second operator to the UE 200.

The user-identification-response transmitter-receiver unit 105 transmits a user authentication response (a user auth resp) to a user-authentication transfer-setup request (a User auth+transfer Setup Req) from the HSS 300 to the HSS 300 (the old HSS) via the UE 200. The user-identification-response transmitter-receiver unit 105 receives the user-authentication transfer-setup request (the User auth+transfer Setup Req) from the HSS 300.

Specifically, the user-identification-response transmitter-receiver unit 105 authenticates an authentication token (an AUTN), and calculates a transfer key TK. The user-identification-response transmitter-receiver unit 105 acquires a transfer token (a transfer Token) by decoding an encoded token (an enc Token) by using the transfer key TK determined by the calculation. In addition, the user-identification-response transmitter-receiver unit 105 acquires a new subscriber identifier (a new Customer ID) by decoding an encoded new identifier (an enc New ID) by using the transfer key TK.

The DH message processing unit 107 generates a message (a DH response message), according to a Diffie-Hellman key exchange protocol (a predetermined key exchange protocol), in response to a DH initial message received from the HSS 400 (the new HSS), and transmits the generated message to the HSS 400 via the UE 200. Specifically, according to the Diffie-Hellman key exchange protocol, the DH message processing unit 107 generates a shared secret key (a shared-Secret Key) shared between the embedded subscriber identification module and the second subscriber server by using the transfer Token. When the shared-Secret Key is successfully generated, the DH message processing unit 107 transmits the DH response message to the HSS 400.

The attach-procedure profile processing unit 109 executes profile processing in an attach procedure for the HSS 400 by using the shared-Secret Key generated by the DH message processing unit 107, and the new Customer ID. In addition, accompanying the execution of the attach procedure with the HSS 400, the attach-procedure profile processing unit 109 deletes the subscriber profile which is stored in the subscriber-profile storage unit 101 as a subscriber profile for the first operator that manages the HSS 300 (the old HSS).

(2.2) UE 200

Figure 3:
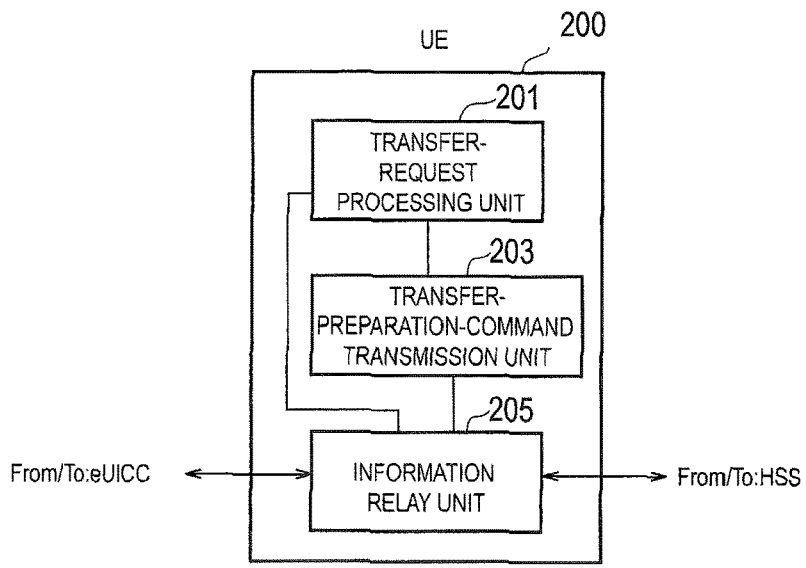
FIG. 3 is a functional block configuration diagram of a UE 200 according to the embodiment of the present invention.

FIG. 3 is a functional block configuration diagram of the UE 200. The UE 200 includes a transfer-request processing unit 201, a transfer-preparation-command transmission unit 203, and an information relay unit 205, as illustrated in FIG. 3.

Based on the transfer Request from the eUICC 100, the transfer-request processing unit 201 transmits a transfer Request including a new subscriber server identifier (a new HSS ID) for identifying the HSS 400 (the new HSS), and the customer Transfer PIN, and the operator Transfer Nonce to the HSS 300.

Based on the transfer Request from the eUICC 100, the transfer-preparation-command transmission unit 203 transmits the transfer preparation command (the transfer Prepare) to the eUICC 100. Specifically, the transfer-preparation-command transmission unit 203 transmits the transfer Prepare including the new Operator ID, the UICC Transfer PIN, and the operator Transfer Nonce to the eUICC 100.

The information relay unit 205 relays information such as the subscriber profile transmitted from the eUICC 100 to the HSS 300 or the HSS 400, and relays information transmitted from the HSS 300 or the HSS 400 to the eUICC 100. Specifically, the information relay unit 205 relays the user auth resp transmitted from the user-identification-response transmitter-receiver unit 105 to the HSS 300, and relays the User auth+transfer Setup Req transmitted from the HSS 300 to the eUICC 100.

Further, the information relay unit 205 relays the DH initial message transmitted from the HSS 400 to the eUICC 100, and relays the DH response message transmitted from the DH message processing unit 107 to the HSS 400. Furthermore, the information relay unit 205 relays information such as the subscriber profile accompanying the execution of the attach procedure between the attach-procedure profile processing unit 109 and the HSS 400.

(2.3) HSS 300

Figure 4:
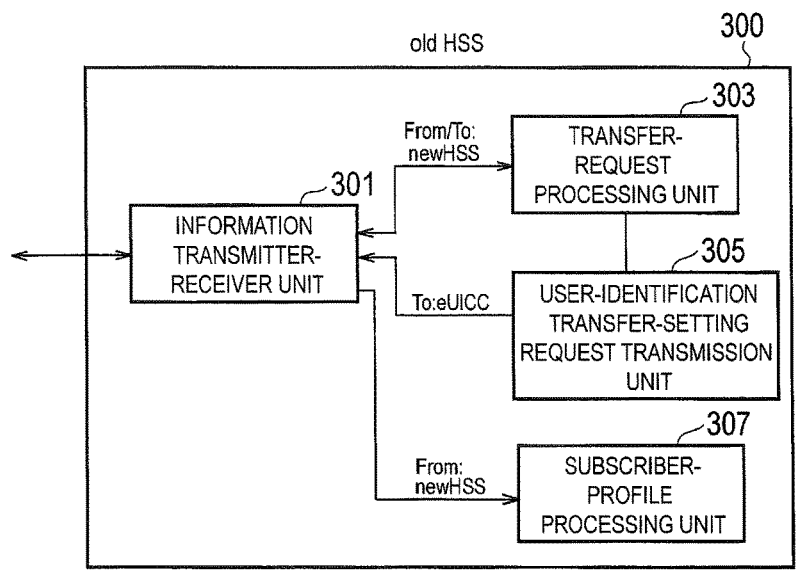
FIG. 4 is a functional block configuration diagram of an HSS 300 according to the embodiment of the present invention.

FIG. 4 is a functional block configuration diagram of the HSS 300. The HSS 300 includes an information transmitter-receiver unit 301, a transfer-request processing unit 303, a user-identification transfer-setting request transmission unit 305, and a subscriber-profile processing unit 307, as illustrated in FIG. 4.

The information transmitter-receiver unit 301 transmits and receives information, which is transmitted and received by the transfer-request processing unit 303 or the user-identification transfer-setting request transmission unit 305 to and from a related node.

The transfer-request processing unit 303 transmits a transfer Request to the HSS 400, based on the transfer Request from the UE 200. Specifically, the transfer-request processing unit 303 transmits the transfer Request including a subscriber identifier (a customer ID) associated with the UE 200 to the HSS 400 via a secure tunnel that is a secure channel established with the HSS 400. Note that the secure tunnel established between the HSS 300 and the HSS 400 is established according to an existing encryption scheme defined in the 3GPP. Further, for the customer ID, the IMSI described above may be used, or any other kind of information may be used if the information is capable of identifying the user (the subscription subscriber) of the UE 200.

The transfer-request processing unit 303 receives a response (a transfer ok) to the transfer Request transmitted to the HSS 400, from the HSS 400. Specifically, the transfer-request processing unit 303 receives the transfer ok including the new Customer ID for identifying the UE 200 in the second operator, from the HSS 400.

The user-identification transfer-setting request transmission unit 305 transmits the User auth+transfer Setup Req (the user-authentication transfer-setup request) for requesting the authentication of the UE 200 and the transfer of the subscriber profile to the eUICC 100. Specifically, the user-identification transfer-setting request transmission unit 305 generates the transfer key TK by using a secret key K held by the HSS 300 and the eUICC 100. Further, the user-identification transfer-setting request transmission unit 305 generates the enc Token by encoding the transfer Token that is a temporary operator for transfer by using the generated transfer key TK.

Further, the user-identification transfer-setting request transmission unit 305 generates the enc New ID by encoding the new Customer ID by using the transfer key TIC Furthermore, the user-identification transfer-setting request transmission unit 305 generates a message authentication code (a MAC) including the operator Transfer Nonce, the enc Token, and the enc New ID, and transmits the User auth+transfer Setup Req including the AUTN generated by the generated MAC, the enc Token, and the enc New ID to the eUICC 100. Note that the MAC in the present embodiment is a function (f) using the secret key K, a RAND (a random number), and a SEQ (a sequence number), and the operator Transfer Nonce, as parameters.

Further, the user-identification transfer-setting request transmission unit 305 transmits the transfer Token to the HSS 400 via the secure tunnel that is a secure channel between the HSSs of the operators.

The subscriber-profile processing unit 307 deletes the subscriber profile associated with the UE 200, based on an instruction to delete the subscriber profile from the HSS 400.

(2.4) HSS 400

Figure 5:
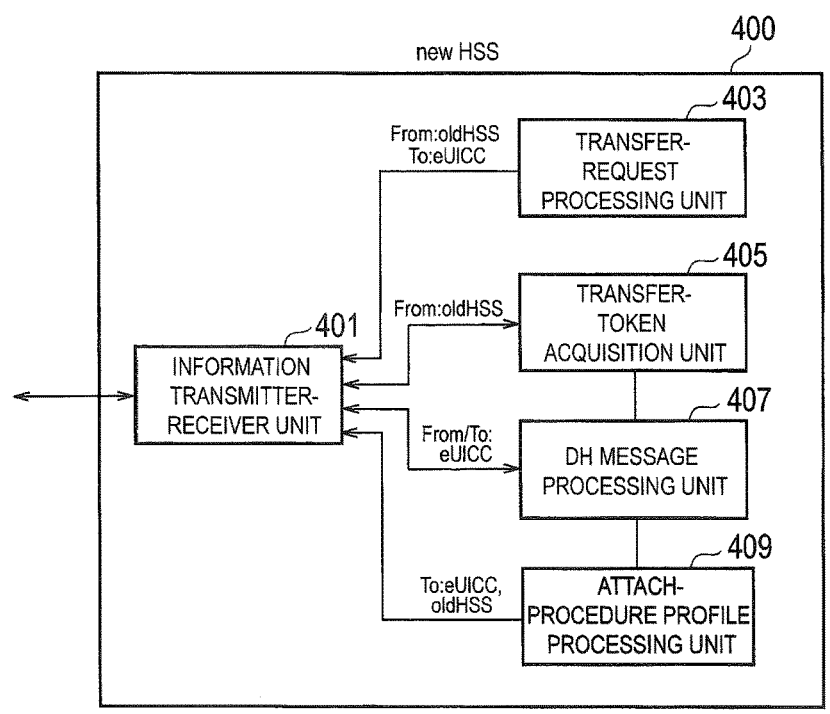
FIG. 5 is a functional block configuration diagram of an HSS 400 according to the embodiment of the present invention.

FIG. 5 is a functional block configuration diagram of the HSS 400. The HSS 400 includes an information transmitter-receiver unit 401, a transfer-request processing unit 403, a transfer-token acquisition unit 405, a DH message processing unit 407, and an attach-procedure profile processing unit 409, as illustrated in FIG. 5.

The information transmitter-receiver unit 401 transmits and receives information transmitted and received by the transfer-request processing unit 403, the transfer-token acquisition unit 405, the DH message processing unit 407, and the attach-procedure profile processing unit 409.

The transfer-request processing unit 403 receives the transfer Request transmitted from the HSS 300. In addition, the transfer-request processing unit 403 transmits the message (the DH initial message) including the new Operator ID, the new Customer ID, and the MAC including the transfer Token to the eUICC 100, according to the Diffie-Hellman key exchange protocol.

The transfer-token acquisition unit 405 acquires the transfer Token transmitted from the HSS 300 via the secure tunnel, and provides the acquired transfer Token to the transfer-request processing unit 403.

The DH message processing unit 407 generates the shared-Secret Key necessary for generation of the DH initial message, according to the Diffie-Hellman key exchange protocol, and provides the generated DH initial message to the transfer-request processing unit 403. Specifically, the DH message processing unit 407 generates the shared-Secret Key shared between the eUICC 100 and the HSS 400, according to the Diffie-Hellman key exchange protocol.

The attach-procedure profile processing unit 409 executes the profile processing in the attach procedure of the eUICC 100 and the UE 200 by using the shared-Secret Key generated by the DH message processing unit 407, and the new Customer ID. Specifically, the attach-procedure profile processing unit 409 exchanges and processes the secret key K, a normal UMTS AKA, and information such as the subscriber profile necessary for the execution of the attach procedure, in a secure communication environment established using the shared-Secret Key.

Further, accompanying the execution of the attach procedure with the eUICC 100, the attach-procedure profile processing unit 409 instructs the HSS 300 (the old HSS) to delete the subscriber profile associated with the UE 200.

(3) Operation of Subscriber Profile Transfer System

Next, operation of the above-described subscriber profile transfer system (the eUICC 100, the UE 200, the HSS 300, and the HSS 400) is described. Specifically, there is described operation of each of subscriber profile transfer preparation, transfer setup between the eUICC 100 and the HSS 300 (the old HSS), and authentication as well as key exchange between the eUICC 100 and the HSS 400 (the new HSS).

(3.1) Subscriber Profile Transfer Preparation

Figure 6:
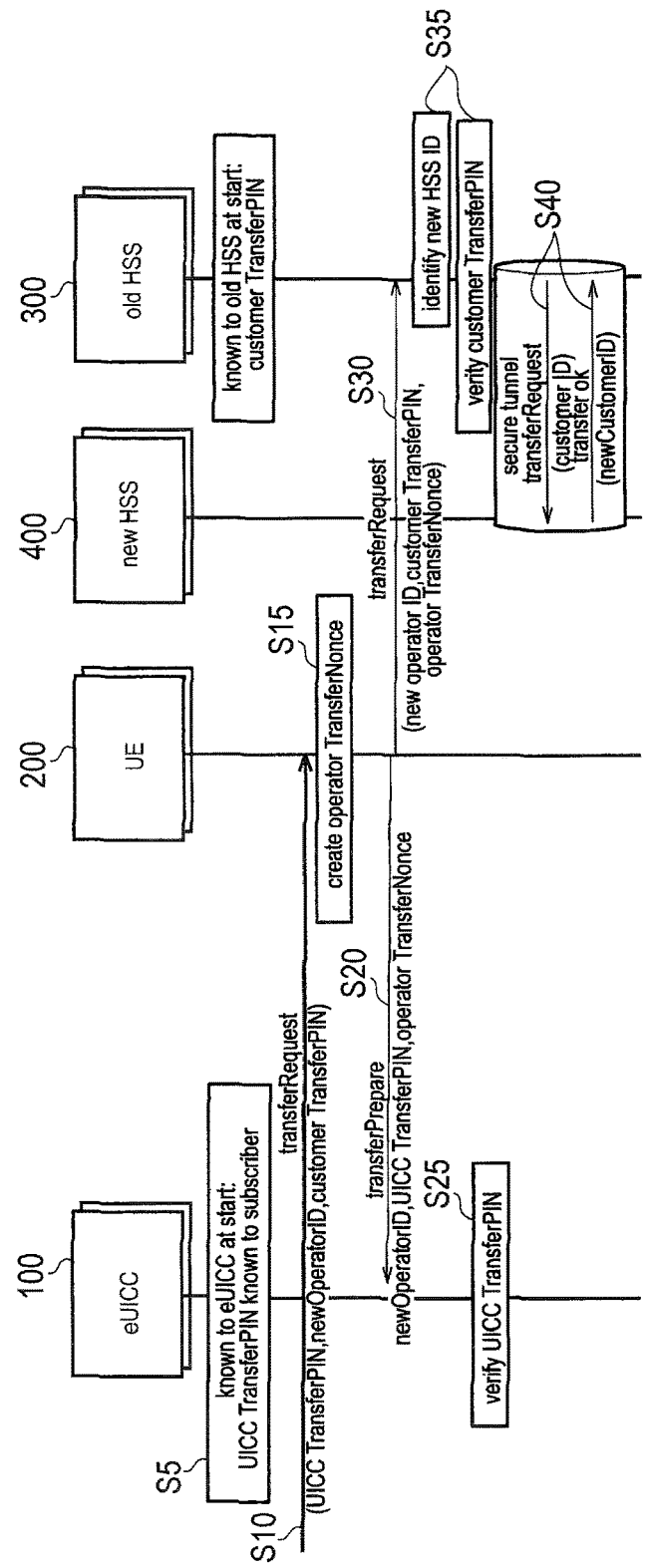
FIG. 6 is a diagram illustrating a subscriber-profile transfer preparation sequence according to the embodiment of the present invention.

FIG. 6 illustrates a subscriber-profile transfer preparation sequence. In the present embodiment, there is described, as an example, the case where, when the user of the UE 200 changes from the usage subscription of the communication service provided by the first operator to the usage subscription of the communication service provided by the second operator, the subscriber profile associated with the UE 200 is transferred from the HSS 300 to the HSS 400, as described above.

In addition, in the present embodiment, the following preconditions are provided. First, the UICC Transfer PIN is exchanged between the first operator and the user (the subscription subscriber) of the UE 200 beforehand. Therefore, the user of the UE 200 knows this PIN code already. The UICC Transfer PIN verifies whether the user of the UE 200 and the UICC itself form a correct combination. Note that the UICC Transfer PIN is different from the secret key K in the Authentication and Key Agreement (AKA) procedure.

Further, the customer Transfer PIN is provided from the first operator to the user of the UE 200 via a different route, after going through the above-described transaction. For example, the customer Transfer PIN is provided, in a state of being associated with an initial customer ID, from the operator of a usage-subscription change source to this user via a website. The customer Transfer PIN can verify whether this user, not other person pretending to be the user, is executing a transaction concerning this usage-subscription change. In an alternative way, the user may be notified of the customer Transfer PIN via a document or the like by mail from this operator.

The user of the UE 200 can use the communication service via this operator by inputting the initial customer ID into the UE 200 (actually, the eUICC 100). In this case, processing based on an existing AKA procedure is executed between the eUICC 100 and the HSS 300.

When such preconditions are satisfied, i.e., when the UE 200 (the eUICC 100) subscribing to the operator managing the HSS 300 (the first operator) changes from this operator to the operator managing the HSS 400 (the second operator), the subscriber profile transfer preparation begins.

Specifically, the eUICC 100 acquires the UICC Transfer PIN inputted by the user of the UE 200 (S5). The UICC Transfer PIN is information unique to the eUICC 100, and can be known to only the user of the UE 200. The UICC Transfer PIN verifies that the transfer of the subscriber profile is requested by the eUICC 100, thereby preventing an unauthorized transfer of the subscriber profile by a third party. In other words, the transfer of the subscriber profile cannot start, unless the UICC Transfer PIN is inputted into the eUICC 100 via the UE 200.

The eUICC 100 transmits the transfer Request to the UE 200, based on the appropriate UICC Transfer PIN (S10). The transfer Request includes the UICC Transfer PIN, the new Operator ID, and the customer Transfer PIN. Note that the customer Transfer PIN is acquired, when being inputted into the UE 200 by the user of the UE 200 prompted to do so.

The UE 200 generates the operator Transfer Nonce, based on the received transfer Request (S15).

The new Operator ID is an identifier determined based on a request made by this user, and indicates the operator of a transfer destination of the subscriber profile (to which the operator of the subscription is to be changed). The operator Transfer Nonce instructs the eUICC 100 and the HSS 300 to perform a subscriber-profile transfer preparation. Note that Nonce is a one-time number, and can identify this transfer request by distinguishing this transfer request from other transfer requests, in steps to be described later.

The UE 200 transmits the transfer Prepare, which is a response to the transfer Request transmitted from the eUICC 100, to the eUICC 100 (S20). The transfer Prepare includes the new Operator ID, the UICC Transfer PIN, and the operator Transfer Nonce.

In addition, the UE 200 transmits the transfer Request to the HSS 300, based on the transfer Request transmitted from the eUICC 100 (S30). The transfer Request transmitted from the UE 200 to the HSS 300 includes the new Operator ID, the customer Transfer PIN, and the operator Transfer Nonce.

Upon acquiring the new Operator ID, the HSS 300 identifies the new HSS ID from the new Operator ID, thereby acquiring an address (HSS) to which the transfer ok is to be transmitted, and verifies the customer Transfer PIN included in the transfer Request transmitted from the UE 200 (S35). The HSS 300 transmits the transfer Request to the HSS 400, based on the identified new HSS ID. Further, the HSS 400 transmits the transfer ok that is a response to this transfer Request to the HSS 300 (S40). Note that these transfer Request and transfer ok are transmitted and received via the secure tunnel established between the HSS 300 and the HSS 400. In addition, this transfer Request includes the customer ID for identifying the user of the UE 200 in the first operator, and the transfer ok includes the new Customer ID (for example, the IMSI) for identifying this user in the second operator.

(3.2) Transfer Setup Between eUICC 100 and HSS 300 (Old HSS)

Figure 7:
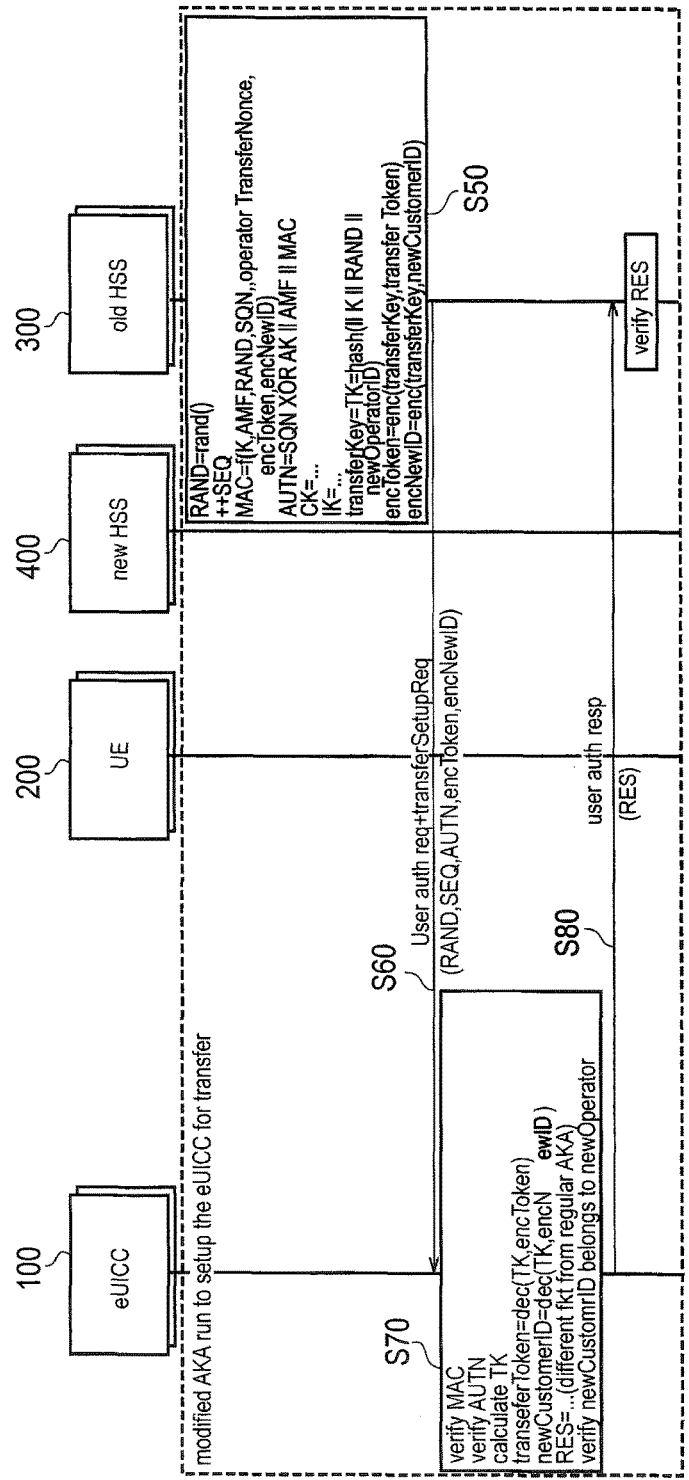
FIG. 7 is a diagram illustrating a transfer setup sequence between the eUICC 100 and the HSS 300 (an old HSS) according to the embodiment of the present invention.

FIG. 7 illustrates a transfer setup sequence between the eUICC 100 and the HSS 300 (the old HSS). As illustrated in FIG. 7, a transfer setup process of the eUICC 100 is executed between the eUICC 100 and the HSS 300 (the old HSS). In the present embodiment, the existing AKA (authentication and key exchange) procedure is expanded to implement this process.

Specifically, the HSS 300 generates information to be included in the User auth+transfer Setup Req to transmit the User auth+transfer Setup Req to the eUICC 100 (S50). To be more specific, the HSS 300 verifies the corresponding secret key K, and generates the message authentication code (the MAC) that proves there is no tampering with an AMF (an Authentication Management Field, 3GPP TS33.102), the RAND (the random number), the SEQ (the sequence number, 3GPP TS33.102), the operator Transfer Nonce, and the enc New ID, between the eUICC and the HSS. The MAC is generated by a function using the AMF (the Authentication Management Field, 3GPP TS33.102), and in addition to the RAND as well as the SEQ, the secret key K held by the eUICC 100 and the HSS 300, the operator Transfer Nonce transmitted from the UE 200, the enc Token, and the enc New ID, as parameters. In this way, when a calculation output value of the MAC includes the operator Transfer Nonce, the enc Token, the enc New ID, the transfer Token, and the new Customer ID as parameters, and a value determined by performing a calculation on the eUICC 100 side is identical to the calculation output value, the eUICC 100 recognizes that there is no tampering with the AUTN (the authentication token) from the HSS 300. In addition, in a MAC according to the Diffie-Hellman (DH) key exchange protocol (a DH-MAC), the transfer Token is necessary to authenticate the new HSS, and is the most important element.

In addition, the HSS 300 generates the AUTN that is a combination of an exclusive OR (XOR) of the SEQ and an authentication key AK, the AMF, and the MAC. The AUTN is a security token to be used for authentication of the eUICC 100.

The enc Token is obtained by encoding the transfer Token by using the transfer key TK. Similarly, the enc New ID is obtained by encoding the new Customer ID by using the transfer key TK. The transfer key TK is generated to vary, each time this key is generated. Specifically, a new transfer key TK is generated using a key generation function, each time the above-described sequence of step S50 is executed. A hash function used here uses the secret key K, the RAND, and the new Operator ID as parameters of the key generation function, and changes the transfer key TK each time this sequence is executed. By such processing, the transfer Token and the new Customer ID are securely provided to the eUICC 100 via the old HSS. A CK is a ciphering key (an encryption key) and an IK is an integrity key (a key for keeping integrity). These keys are used to keep encryption of transmission information and integrity of information after authentication between the old-HSS and the eUICC (i.e., after RES matching), and these keys are provided to the eUICC 100 as well, at this stage.

The HSS 300 transmits the User auth+transfer Setup Req generated by such a procedure to the eUICC 100 (S60).

Based on the User auth+transfer Setup Req transmitted from the HSS 300, the eUICC 100 executes authentication of the eUICC 100 and a series of steps of decryption (decoding) processing for the transmission information (S70). Specifically, the eUICC 100 executes authentication processing for the AUTN included in the User auth+transfer Setup Req. First, the eUICC 100 verifies the AUTN, based on the transmitted RAND, the AMF, the secret key K held in itself, a SQN, the enc Token, the enc New ID, and the calculated authentication key AK and MAC value. The MAC value is calculated from values of a shared-Secret Key K, the SQN, the transmitted RAND, the transmitted AMF, the operator Transfer Nonce transmitted beforehand, as well as the enc Token and the enc New ID. Afterward, the eUICC 100 calculates the transfer key TK by using information included in the AUTN. The transfer key TIC is derived by performing a calculation using a key generation function similar to that of the HSS 300 by including the shared-Secret Key K, the RAND transmitted beforehand, the new Operator ID, and the like.

Finally, using this TK value, the eUICC 100 decodes the enc Token included in the AUTN, thereby acquiring the transfer Token. Similarly, the eUICC 100 decodes the enc Token included in the enc New ID, thereby acquiring the new Customer ID.

When the authentication processing for the AUTN is successfully completed, the eUICC 100 transmits the user auth resp to the HSS 300, as a response (a RES) to the User auth+transfer Setup Req (S80). By the user auth resp, the HSS 300 recognizes that, in addition to the authentication with the HSS 300, a subscriber-profile transfer setup is successfully completed by the eUICC 100. Note that the successful completion of the mutual authentication and the subscriber-profile transfer setup is determined based on whether an expected-RES and the RES (the user auth resp) match with each other.

When the processing to step S80 is completed, the eUICC 100 and the HSS 300 (the old HSS) are in a state of holding the shared-Secret Key that can authenticate the new HSS.

(3.3) Authentication and Key Exchange Between eUICC 100 and HSS 400 (new HSS)

Figure 8:
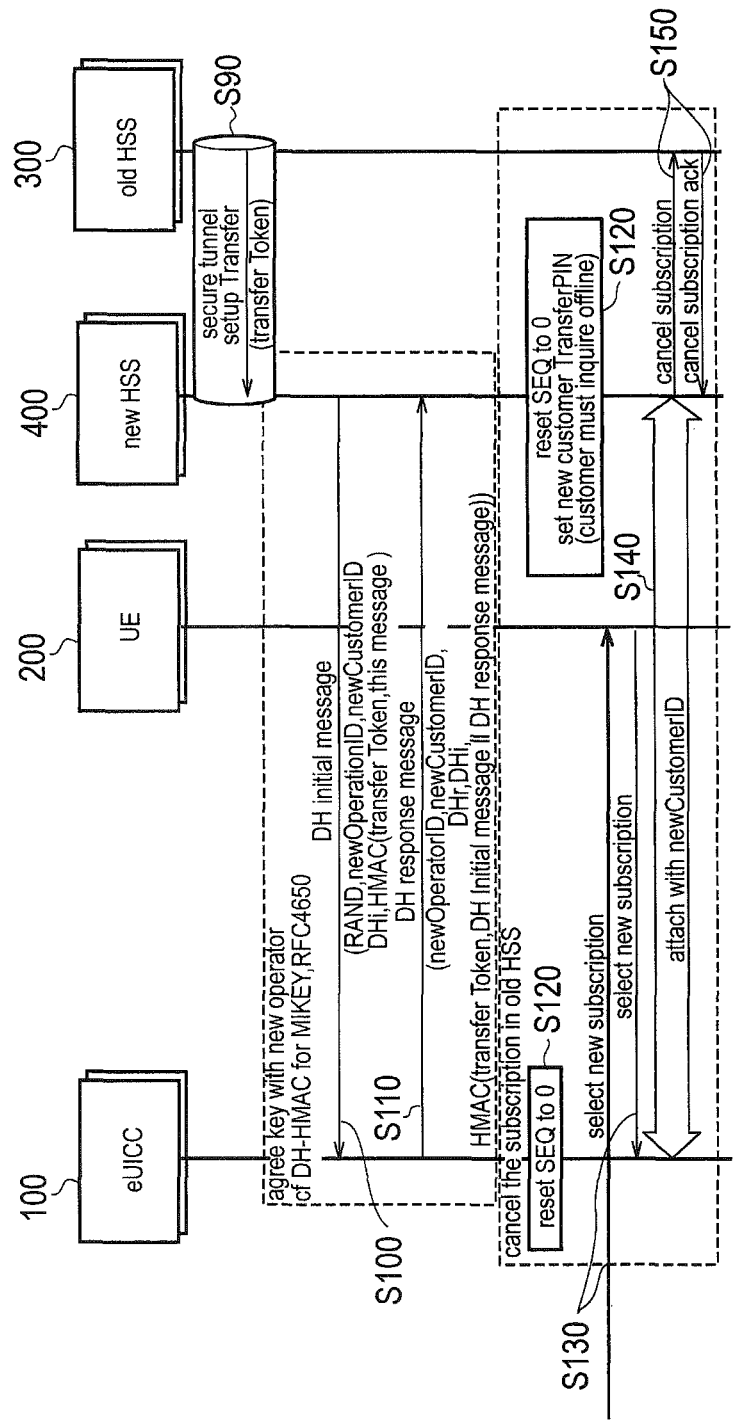
FIG. 8 is a diagram illustrating an authentication and key exchange sequence between the eUICC 100 and the HSS 400 (a new HSS) according to the embodiment of the present invention.

FIG. 8 illustrates an authentication and key exchange sequence between the eUICC 100 and the HSS 400 (the new HSS). As illustrated in FIG. 8, the HSS 300 provides a request for a subscriber-profile transfer setup (a setup Transfer) to the HSS 400 via the secure tunnel established between the HSS 300 and the HSS 400 (S90). The setup Transfer includes the transfer Token. The HSS 400 is notified of the transfer Token via the secure tunnel, and therefore, the transfer Token in an encoded state can be securely provided to the HSS 400.

Based on the setup Transfer transmitted from the HSS 300, the HSS 400 transmits the DH initial message to the eUICC 100 (S100). The DH initial message includes the RAND, the new Operator ID, the new Customer ID, a DHi (a public value of an initiator in the DH), and a value calculated by an HMAC (a Hash-based Message Authentication Code) using the transfer Token received by the HSS 400 from the HSS 300 as a parameter. In other words, the HSS 400 performs key exchange based on the Diffie-Hellman key exchange protocol (the DH), but generates a MAC (a message authentication code) using the transfer Token, and transmits the DH initial message including such a MAC to the eUICC 100, so that the authentication processing for the message from the HSS 400 is executed in the eUICC 100.

The eUICC 100 transmits the DH response message that is a response to the DH initial message transmitted from the HSS 400 to the HSS 400 (S110). The DH initial message includes a DHr (a public value of a responder in the DH), the DHi, the new Operator ID, the new Customer ID, and a value calculated by the HMAC using the transfer Token received from the HSS 300 as a parameter. In a manner similar to step S100, the eUICC 100 generates a MAC (a message authentication code) using the transfer Token, and transmits the DH initial message including such a MAC to the HSS 400, so that the authentication processing for the message from the eUICC 100 is executed in the HSS 400.

When the processing to step S110 is completed, the eUICC 100 and the HSS 400 can generate the shared-Secret Key, and thus can hold the shared-Secret Key. Here, FIG. 9 illustrates a generation sequence for the shared-Secret Key by the eUICC 100 and the HSS 400 based on the DH.

Figure 9:
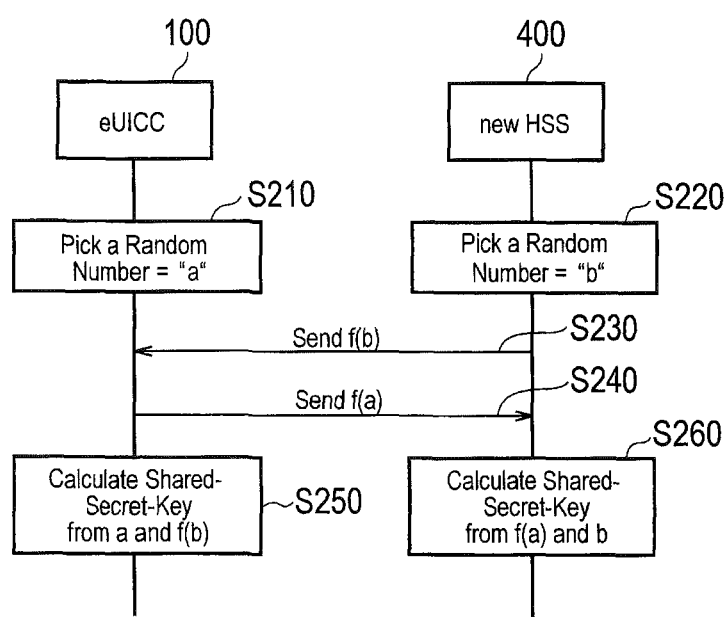
FIG. 9 is a diagram illustrating a shared-Secret Key generation sequence between the eUICC 100 and the HSS 400 based on a Diffie-Hellman key exchange protocol according to the embodiment of the present invention.

As illustrated in FIG. 9, the eUICC 100 selects a random number a, and the HSS 400 (the new HSS) selects a random number b (S210, S220). The HSS 400 transmits a function f(b) using the selected random number b to the eUICC 100 (S230). Similarly, the eUICC 100 transmits a function f(a) using the selected random number a to the eUICC 100 (S240).

Based on the DH, the eUICC 100 generates the shared-Secret Key, using the selected random number a and the function f(b) (S250). Similarly, based on the DH, the HSS 400 generates the shared-Secret Key, using the selected random number b and the function f(a) (S260).

The shared-Secret Key thus generated is held only by the eUICC 100 and the HSS 400, and the HSS 300 cannot know this shared-Secret Key.

In such a state that the shared-Secret Key is thus held by the eUICC 100 and the HSS 400, the eUICC 100 and the HSS 400 each reset the past sequence (the SEQ) (S120). In addition, the HSS 400 sets a new customer Transfer PIN, for the next transfer of the subscriber profile.

After being notified of the new customer Transfer PIN by a different route (for example, being notified through a written notice or a website), the user provides an instruction of a select new subscription to the UE 200. Based on the instruction of the select new subscription, the UE 200 transfers a connection instruction for the second operator to the eUICC 100 (S130). Based on this connection instruction, the eUICC 100 exchanges the shared-Secret Key K, the normal UMTS AKA, and the information necessary for the execution of the attach procedure, while establishing a secure communication environment by using the generated shared-Secret Key, and then executes the normal attach procedure with the HSS 400, based on this subscription (the secret key K and the IMSI) (S140).

Further, upon completion of the first processing using the generated shared-Secret Key, the HSS 400 provides a request (a cancel subscription) for cancellation of the subscription of the UE 200 for the first operator to the HSS 300 (the old HSS), and the HSS 300 provides a response (a cancel subscription ack) indicating this subscription being cancelled (S150).

(4) Advantageous Effects

According to the subscriber profile transfer system (the eUICC 100, the UE 200, the HSS 300, and the HSS 400) according to the present embodiment described above, the eUICC and the user (the subscriber of the subscription) for which the subscriber profile is to be transferred can be securely and reliably identified by using the UICC Transfer PIN and the customer Transfer PIN.

In addition, the transfer Token is exchanged between the eUICC 100 and the HSS 300 that are already authenticated. Specifically, the enc Token obtained by encoding the transfer Token is transmitted from the HSS 300 (the old HSS) to the eUICC 100 (see step S50 of FIG. 7). Further, the transfer Token is transmitted from the HSS 300 to the HSS 400 (the new HSS) via the secure tunnel (see step S90 of FIG. 8). Next, the HSS 400 transmits the DH initial message including the transfer Token to the eUICC 100 (see step S100 of FIG. 7). The authentication between the eUICC 100 and the new HSS using the transfer Token, and the generation of the shared-Secret Key held only by the eUICC 100 and the HSS 400 after this authentication are thereby implemented. Therefore, the eUICC 100 and the HSS 400 can exchange the subscriber profile that should be transferred, in a secure communication environment using this shared-Secret Key.

In other words, according to the subscriber profile transfer system according to the present embodiment, the subscriber profile and the like necessary for the activation of the eUICC can be securely transferred between the operators, without using a Subscription Manager (SM) connected to equipment of each of the operators.

Further, in the present embodiment, the operator Transfer Nonce is included in the transfer Request transmitted from the UE 200 to the HSS 300, and in the transfer Prepare transmitted from the UE 200 to the eUICC 100. In addition, the operator Transfer Nonce is also included in the User auth+transfer Setup Req transmitted from the HSS 300 to the eUICC 100. Therefore, the eUICC 100 can uniquely identify whether the received User auth+transfer Setup Req is based on the transfer Request from the eUICC 100, and can preclude an unauthorized transfer request to the eUICC 100.

Furthermore, in the present embodiment, the UICC Transfer PIN inputted by the user of the UE 200, and therefore, an intention of changing the operator to which this user subscribes can be reliably verified.

(5) Other Embodiment

As described above, the details of the present invention have been disclosed by using the embodiment of the present invention. However, it should not be understood that the description and drawings which constitute part of this disclosure limit the present invention. From this disclosure, various alternative embodiments will be easily found by those skilled in the art.

For example, in the above-described embodiment, the DH-HMAC based on the Diffie-Hellman key exchange protocol is described as an example of the predetermined key exchange protocol. However, this key exchange protocol is not limited to the DH-HMAC, and other protocol based on the Diffie-Hellman may be used, if this protocol employs a scheme based on a public key technique not using a key distribution center or the like.

Further, in the above-described embodiment, the UICC Transfer PIN is used, but the UICC Transfer PIN is not essential, and may be omitted. Similarly, the operator Transfer Nonce is not essential either, and may be omitted.

The features of the present embodiment may also be expressed as follows. A first feature of the present embodiment is summarized as a subscriber profile transfer method of transferring a subscriber profile associated with user equipment from a first operator to a second operator by using the user equipment, an embedded subscriber identification module that is a subscriber identification module embedded in the user equipment, a first subscriber server managed by the first operator, and a second subscriber server managed by the second operator, the method including the steps of: causing the embedded subscriber identification module to transmit a transfer request for the subscriber profile to the user equipment, the transfer request including a module transfer identifier associated with the embedded subscriber identification module, an operator-transfer temporary number associated with a transfer of the subscriber profile, a subscriber transfer identifier indicating that the transfer is authenticated by a user of the user equipment, and a new operator identifier for identifying the second operator; causing the user equipment to transmit a transfer request including a subscriber transfer identifier for identifying the second subscriber server, the subscriber transfer identifier, and the operator-transfer temporary number to the first subscriber server, and to transmit a transfer preparation command including the new operator identifier, the module transfer identifier, and the operator-transfer temporary number to the embedded subscriber identification module; causing the first subscriber server to transmit a transfer request including a subscriber identifier associated with the user equipment to the second subscriber server via a secure channel established with the second subscriber server, and to receive a response including a new subscriber identifier for identifying the user equipment in the second operator from the second subscriber server; causing the first subscriber server to generate a transfer key by using a secret key held by the first subscriber server and the embedded subscriber identification module, to generate an encoded token by encoding a transfer token that is a temporary operator for transfer by using the transfer key, to generate an encoded new identifier by encoding the new subscriber identifier by using the transfer key, to generate a message authentication code including the operator-transfer temporary number, the encoded token, and the encoded new identifier, and to transmit a user-authentication transfer-setup request including an authentication token generated using the message authentication code, the encoded token, and the encoded new identifier to the embedded subscriber identification module; causing the embedded subscriber identification module to authenticate the authentication token and calculate the transfer key, to acquire the transfer token by decoding the encoded token by using the transfer key, to acquire the new subscriber identifier by decoding the encoded new identifier by using the transfer key, and to transmit a user authentication response to the user-authentication transfer-setup request to the first subscriber server; causing the first subscriber server to transmit the transfer token to the second subscriber server via the secure channel; causing the second subscriber server to transmit a message including the new operator identifier, the new subscriber identifier, and a message authentication code including the transfer token to the embedded subscriber identification module according to a predetermined key exchange protocol; and causing each of the embedded subscriber identification module and the second subscriber server to generate a shared secret key using the transfer token, the shared secret key shared between the embedded subscriber identification module and the second subscriber server, and execute an attach procedure by using the generated shared secret key and the new subscriber identifier.

A second feature of the present embodiment is summarized as a subscriber profile transfer system of transferring a subscriber profile associated with a UE 200 (user equipment) from a first operator to a second operator by using the user equipment, an eUICC 100 (embedded subscriber identification module) that is a subscriber identification module embedded in the user equipment, an HSS 300 (first subscriber server) managed by the first operator, and an HSS 400 (second subscriber server) managed by the second operator. Here, the embedded subscriber identification module transmits a transfer request for the subscriber profile to the user equipment, the transfer request including a UICC Transfer PIN (module transfer identifier) associated with the embedded subscriber identification module, an operator Transfer Nonce (operator-transfer temporary number) associated with a transfer of the subscriber profile, a customer Transfer PIN (subscriber transfer identifier) indicating that the transfer is authenticated by a user of the user equipment, and a new Operator ID (new operator identifier) for identifying the second operator, the user equipment transmits a transfer request including a new HSS ID (new subscriber server identifier) for identifying the second subscriber server, the subscriber transfer identifier, and the operator-transfer temporary number to the first subscriber server, and transmits a transfer Prepare (transfer preparation command) including the new operator identifier, the module transfer identifier, and the operator-transfer temporary number to the embedded subscriber identification module, the first subscriber server transmits a transfer request including a subscriber identifier associated with the user equipment to the second subscriber server via a secure channel established with the second subscriber server, and receives a response including a new Customer ID (new subscriber identifier) for identifying the user equipment in the second operator from the second subscriber server, the first subscriber server generates a transfer key TK (transfer key) by using a secret key K (secret key) held by the first subscriber server and the embedded subscriber identification module, generates an enc Token (encoded token) by encoding a transfer Token (transfer token) that is a temporary operator for transfer by using the transfer key, generates an encoded new identifier by encoding the new subscriber identifier by using the transfer key, generates a MAC (message authentication code) including the operator-transfer temporary number, the encoded token, and the encoded new identifier, and transmits a User auth+transfer Setup Req (user-authentication transfer-setup request) including an AUTN (authentication token) generated using the message authentication code, the encoded token, and the encoded new identifier to the embedded subscriber identification module, the embedded subscriber identification module authenticates the authentication token and calculates the transfer key, acquires the transfer token, by decoding the encoded token by using the transfer key, acquires the new subscriber identifier, by decoding the encoded new identifier by using the transfer key, and transmits a user auth resp (user authentication response to the user-authentication transfer-setup request to the first subscriber server, the first subscriber server transmits the transfer token to the second subscriber server via the secure channel, the second subscriber server transmits a DH initial message (message) including the new operator identifier, the new subscriber identifier, and a message authentication code including the transfer token to the embedded subscriber identification module according to a Diffie-Hellman key exchange protocol (predetermined key exchange protocol), and each of the embedded subscriber identification module and the second subscriber server generates a shared-Secret Key (shared secret key) by using the transfer token, the shared secret key being shared between the embedded subscriber identification module and the second subscriber server, and executes an attach procedure by using the generated shared secret key and the new subscriber identifier.

In the second feature of the present invention, the second subscriber server may generate the message according to a Diffie-Hellman key exchange protocol, and transmits the generated message to the embedded subscriber identification module, and the embedded subscriber identification module and the second subscriber server may each generate the shared secret key according to the Diffie-Hellman key exchange protocol.

In the second feature of the present invention, the message authentication code may be a function in which the secret key, a random number, a sequence number, and the operator-transfer temporary number are used as parameters.

A third feature of the present embodiment is summarized as user equipment including: an embedded subscriber identification module that is a subscriber identification module of an embedded type. Here, the embedded subscriber identification module transmits a transfer request for a subscriber profile to the user equipment, the transfer request including a module transfer identifier associated with the embedded subscriber identification module, an operator-transfer temporary number associated with a transfer of the subscriber profile associated with the user equipment, a subscriber transfer identifier indicating that the transfer is authenticated by a user of the user equipment, and a new operator identifier for identifying a second operator different from a first operator, the user equipment transmits a transfer request including a new subscriber server identifier for identifying a second subscriber server managed by the second operator, the subscriber transfer identifier, and the operator-transfer temporary number to a first subscriber server managed by the first operator, and transmits a transfer preparation command including the new operator identifier, the module transfer identifier, and the operator-transfer temporary number to the embedded subscriber identification module, and the embedded subscriber identification module authenticates an authentication token transmitted from the first subscriber server managed by the first operator, and calculates a transfer key by using a secret key held by the first subscriber server and the embedded subscriber identification module, acquires a transfer token that is a temporary operator for transfer, by decoding an encoded token by using the transfer key, acquires a new subscriber identifier for identifying the user equipment in the second operator by decoding an encoded new identifier by using the transfer key, transmits a user authentication response to a user-authentication transfer-setup request including the authentication token, the encoded token, and the encoded new identifier to the first subscriber server, and generates a shared secret key using the transfer token, the shared secret key shared between the embedded subscriber identification module and the second subscriber server managed by the second operator, and executes an attach procedure for the second subscriber server by using the generated shared secret key and the new subscriber identifier.

A fourth feature of the present embodiment is summarized as a key agreement method using an embedded subscriber identification module that is a subscriber identification module embedded in user equipment, and a subscriber server managed by an operator to which a usage subscription of the user equipment is to be transferred, the method including the steps of: (a) causing the subscriber server to transmit a message including a selected random number to the embedded subscriber identification module according to a Diffie-Hellman key exchange protocol; (b) causing the embedded subscriber identification module to transmit a message including a selected random number to the subscriber server according to the Diffie-Hellman key exchange protocol; (c) causing the subscriber server to generate a shared secret key shared between the embedded subscriber identification module and the subscriber server by using the message received from the embedded subscriber identification module and the random number selected in (a); and (d) causing the embedded subscriber identification module to generate the shared secret key by using the message received from the subscriber server and the random number selected in (b).

A fifth feature of the present embodiment is summarized as a transfer token agreement method of sharing a transfer token that is a temporary operator for transfer using an embedded subscriber identification module that is a subscriber identification module embedded in user equipment, a first subscriber server managed by a first operator, and a second subscriber server managed by a second operator, the method including the steps of: (a) causing the first subscriber server to select the transfer token; (b) causing the first subscriber server to transmit a user-authentication transfer-setup request including the transfer token to the embedded subscriber identification module; (c) causing the first subscriber server to transmit the transfer token to the second subscriber server via a secure channel; and (d) causing the embedded subscriber identification module to transmit a user authentication response to the user-authentication transfer-setup request to the first subscriber server.

A sixth feature of the present embodiment is summarized as a transfer authentication method of starting a transfer procedure for a transfer of an operator of user equipment including an embedded subscriber identification module from a first operator to a second operator, the method including the steps of: (a) causing the user equipment to transmit a transfer request including a subscriber transfer identifier indicating that the transfer is authenticated by a user of the user equipment to a first subscriber server managed by the first operator; and (b) causing the user equipment to transmit a transfer preparation command including a module transfer identifier associated with the embedded subscriber identification module to the embedded subscriber identification module.

A seventh feature of the present embodiment is summarized as user equipment including an embedded subscriber identification module that is a subscriber identification module of an embedded type. Here, the user equipment transmits a transfer request including a subscriber transfer identifier indicating that a transfer of an operator of the user equipment from a first operator to a second operator is authenticated by a user of the user equipment to a first subscriber server managed by the first operator.

An eighth feature of the present embodiment is summarized as user equipment including an embedded subscriber identification module that is a subscriber identification module of an embedded type. Here, the user equipment transmits a transfer preparation command including a module transfer identifier associated with the embedded subscriber identification module to the embedded subscriber identification module.

A ninth feature of the present embodiment is summarized as a transfer authentication method of performing a transfer of an operator of user equipment to a new operator using the user equipment, an embedded subscriber identification module that is a subscriber identification module embedded in the user equipment, and a subscriber server managed by the operator of the user equipment, the method including the steps of: (a) causing the user equipment to select an operator-transfer temporary number associated with the transfer; (b) causing the user equipment to transmit a transfer preparation command including the operator-transfer temporary number to the embedded subscriber identification module; (c) causing the user equipment to transmit a transfer request including the operator-transfer temporary number to the subscriber server; (d) causing the subscriber server to transmit a user-authentication transfer-setup request including the operator-transfer temporary number to the embedded subscriber identification module; and (e) causing the embedded subscriber identification module to authenticate the operator-transfer temporary number, based on the operator-transfer temporary number acquired in the step (b) and the operator-transfer temporary number acquired in the step (d).

A tenth feature of the present embodiment is summarized as a transfer authentication method of verifying a transfer of an operator of user equipment from a first operator to a second operator using an embedded subscriber identification module that is a subscriber identification module embedded in the user equipment, a first subscriber server managed by the first operator, and a second subscriber server managed by the second operator, the method including the steps of: (a) causing the first subscriber server to transmit a transfer request including a subscriber identifier associated with the user equipment to the second subscriber server; (b) causing the second subscriber server to transmit a response including a new subscriber identifier for identifying the user equipment in the second operator to the first subscriber server; and (c) causing the first subscriber server to transmit a user-authentication transfer-setup request including the new subscriber identifier to the embedded subscriber identification module.

As described above, the present invention naturally includes various embodiments which are not described herein. Accordingly, the technical scope of the present invention should be determined only by the matters to define the invention in the scope of claims regarded as appropriate based on the description.

Note that the entire content of Japanese Patent Application No. 2013-174622 (filed on Aug. 26, 2013) is incorporated herein by reference in the present specification.

INDUSTRIAL APPLICABILITY

According to a feature of the present invention, it is possible to provide a subscriber profile transfer method, a subscriber profile transfer system, and user equipment that enable a subscriber profile and the like necessary for activation of an eUICC to be securely transferred between carriers (operators) without using a Subscription Manager (SM).

EXPLANATION OF THE REFERENCE NUMERALS 10 mobile communication system
20, 25 mobile communication network
30 radio base station
100 eUICC
101 subscriber-profile storage unit
103 transfer-request transmitter-receiver unit
105 user-identification-response transmitter-receiver unit
107 DH message processing unit
109 attach-procedure profile processing unit
200 UE
201 transfer-request processing unit
203 transfer-preparation-command transmission unit
205 information relay unit
300 HSS
301 information transmitter-receiver unit
303 transfer-request processing unit
305 user-identification transfer-setting request transmission unit
307 subscriber-profile processing unit
400 HSS
401 information transmitter-receiver unit
403 transfer-request processing unit
405 transfer-token acquisition unit
407 DH message processing unit
409 attach-procedure profile processing unit

The invention claimed is:

1. A subscriber profile transfer method of transferring a subscriber profile associated with user equipment from a first operator to a second operator by using
   the user equipment,
   an embedded subscriber identification module that is a subscriber identification module embedded in the user equipment,
   a first subscriber server managed by the first operator, and
   a second subscriber server managed by the second operator,
   the method comprising the steps of:
   causing the embedded subscriber identification module to transmit a transfer request for the subscriber profile to the user equipment, the transfer request including a module transfer identifier associated with the embedded subscriber identification module, an operator-transfer temporary number associated with a transfer of the subscriber profile, a subscriber transfer identifier indicating that the transfer is authenticated by a user of the user equipment, and a new operator identifier for identifying the second operator;
   causing the user equipment to transmit a transfer request including a new subscriber server identifier for identifying the second subscriber server, the subscriber transfer identifier, and the operator-transfer temporary number to the first subscriber server, and to transmit a transfer preparation command including the new operator identifier, the module transfer identifier, and the operator-transfer temporary number to the embedded subscriber identification module;
   causing the first subscriber server to transmit a transfer request including a subscriber identifier associated with the user equipment to the second subscriber server via a secure channel established with the second subscriber server, and to receive a response including a new subscriber identifier for identifying the user equipment in the second operator from the second subscriber server;

causing the first subscriber server
to generate a transfer key by using a secret key held by the first subscriber server and the embedded subscriber identification module,
to generate an encoded token by encoding a transfer token that is a temporary operator for transfer by using the transfer key,
to generate an encoded new identifier by encoding the new subscriber identifier by using the transfer key,
to generate a message authentication code including the operator-transfer temporary number, the encoded token, and the encoded new identifier, and
to transmit a user-authentication transfer-setup request including an authentication token generated using the message authentication code, the encoded token, and the encoded new identifier to the embedded subscriber identification module;

causing the embedded subscriber identification module
to authenticate the authentication token and calculate the transfer key,
to acquire the transfer token by decoding the encoded token by using the transfer key,
to acquire the new subscriber identifier by decoding the encoded new identifier by using the transfer key, and
to transmit a user authentication response to the user-authentication transfer-setup request to the first subscriber server;

causing the first subscriber server to transmit the transfer token to the second subscriber server via the secure channel;

causing the second subscriber server to transmit a message including the new operator identifier, the new subscriber identifier, and a message authentication code including the transfer token to the embedded subscriber identification module according to a predetermined key exchange protocol; and causing each of the embedded subscriber identification module and the second subscriber server to generate a shared secret key using the transfer token, the shared secret key shared between the embedded subscriber identification module and the second subscriber server, and execute an attach procedure by using the generated shared secret key and the new subscriber identifier.

2. A subscriber profile transfer system of transferring a subscriber profile associated with user equipment from a first operator to a second operator by using
the user equipment,
an embedded subscriber identification module that is a subscriber identification module embedded in the user equipment,
a first subscriber server managed by the first operator, and
a second subscriber server managed by the second operator,
wherein
the embedded subscriber identification module transmits a transfer request for the subscriber profile to the user equipment, the transfer request including a module, transfer identifier associated with the embedded subscriber identification module, an operator-transfer temporary number associated with a transfer of the subscriber profile, a subscriber transfer identifier indicating that the transfer is authenticated by a user of the user equipment, and a new operator identifier for identifying the second operator, the user equipment transmits a transfer request including a new subscriber server identifier for identifying the second subscriber server, the subscriber transfer identifier, and the operator-transfer temporary number to the first subscriber server, and transmits a transfer preparation command including the new operator identifier, the module transfer identifier, and the operator-transfer temporary number to the embedded subscriber identification module, the first subscriber server transmits a transfer request including a subscriber identifier associated with the user equipment to the second subscriber server via a secure channel established with the second subscriber server, and receives a response including a new subscriber identifier for identifying the user equipment in the second operator from the second subscriber server, the first subscriber server
generates a transfer key by using a secret key held by the first subscriber server and the embedded subscriber identification module,
generates an encoded token by encoding a transfer token that is a temporary operator for transfer by using the transfer key,
generates an encoded new identifier by encoding the new subscriber identifier by using the transfer key,
generates a message authentication code including the operator-transfer temporary number, the encoded token, and the encoded new identifier, and
transmits a user-authentication transfer-setup request including an authentication token generated using the message authentication code, the encoded token, and the encoded new identifier to the embedded subscriber identification module, the embedded subscriber identification module
authenticates the authentication token and calculates the transfer key,
acquires the transfer token by decoding the encoded token by using the transfer key, acquires the new subscriber identifier by decoding, the encoded new identifier by using the transfer key, and
transmits a user authentication response to the user-authentication transfer-setup request to the first subscriber server, the first subscriber server transmits the transfer token to the second subscriber server via the secure channel, the second subscriber server transmits a message including the new operator identifier, the new subscriber identifier, and a message authentication code including the transfer token to the embedded subscriber identification module according to a predetermined key exchange protocol, and each of the embedded subscriber identification module and the second subscriber server generates a shared secret key by using the transfer token, the shared secret key being shared between the embedded subscriber identification module and the second subscriber server, and executes an attach procedure by using the generated shared secret key and the new subscriber identifier.

3. The subscriber profile transfer system according to claim 2, wherein
the second subscriber server generates the message according to a Diffie-Hellman key exchange protocol, and transmits the generated message to the embedded subscriber identification module, and the embedded subscriber identification module and the second subscriber server each generate the shared secret key according to the Diffie-Hellman key exchange protocol.

4. The subscriber profile transfer system according to claim 2, wherein the message authentication code is a function in which the secret key, a random number, a sequence number, and the operator-transfer temporary number are used as parameters.

5. User equipment comprising:
an embedded subscriber identification module that is a subscriber identification module of an embedded type, wherein
the embedded subscriber identification module transmits a transfer request for a subscriber profile to the user equipment, the transfer request including a module transfer identifier associated with the embedded subscriber identification module, an operator-transfer temporary number associated with a transfer of the subscriber profile associated with the user equipment, a subscriber transfer identifier indicating that the transfer is authenticated by a user of the user equipment, and a new operator identifier for identifying a second operator different from a first operator,
the user equipment transmits a transfer request including a new subscriber server identifier for identifying a second subscriber sever managed by the second operator, the subscriber transfer identifier, and the operator-transfer temporary number to a first subscriber server managed by the first operator, and transmits a transfer preparation command including the new operator identifier, the module transfer identifier, and the operator-transfer temporary number to the embedded subscriber identification module, and
the embedded subscriber identification module
authenticates an authentication token transmitted from the first subscriber server managed by the first operator, and calculates a transfer key by using a secret key held by the first subscriber server and the embedded subscriber identification module, acquires a transfer token that is a temporary operator for transfer by decoding an encoded token by using the transfer key,
acquires a new subscriber identifier for identifying the user equipment in the second operator by decoding an encoded new identifier by using the transfer key,
transmits a user authentication response to a user-authentication transfer-setup request including the authentication token, the encoded token, and the encoded new identifier to the first subscriber server, and
generates a shared secret key using the transfer token, the shared secret key shared between the embedded subscriber identification module and the second subscriber server managed by the second operator, and executes an attach procedure for the second subscriber server by using the generated shared secret key and the new subscriber identifier.

6. A key agreement method using an embedded subscriber identification module that is a subscriber identification module embedded in user equipment, and a subscriber server managed by an operator to which a usage subscription of the user equipment is to be transferred, the method comprising the steps of:
(a) causing the subscriber server to transmit a message including a selected random number to the embedded subscriber identification module according to a Diffie-Hellman key exchange protocol;
(b) causing the embedded subscriber identification module to transmit a message including a selected random number to the subscriber server according to the Diffie-Hellman key exchange protocol;
(c) causing the subscriber server to generate a shared secret key shared between the embedded subscriber identification module and the subscriber server by using the message received from the embedded subscriber identification module and the random number selected in (a); and
(d) causing the embedded subscriber identification module to generate the shared secret key by using the message received from the subscriber server and the random number selected in (b).

7. A transfer token agreement method of sharing a transfer token that is a temporary operator for transfer using
an embedded subscriber identification module that is a subscriber identification module embedded in user equipment,
a first subscriber server managed by a first operator, and
a second subscriber server managed by a second operator,
the method comprising the steps of:
(a) causing the first subscriber server to select the transfer token;
(b) causing the first subscriber server to transmit a user-authentication transfer-setup request including the transfer token to the embedded subscriber identification module;
(c) causing the first subscriber server to transmit the transfer token to the second subscriber server via a secure channel; and
(d) causing the embedded subscriber identification module to transmit a user authentication response to the user-authentication transfer-setup request to the first subscriber server.

8. A transfer authentication method of performing a transfer of an operator of user equipment to a new operator using
the user equipment,
an embedded subscriber identification module that is a subscriber identification module embedded in the user equipment, and
a subscriber server managed by the operator of the user equipment,
the method comprising the steps of:
(a) causing the user equipment to select an operator-transfer temporary number associated with the transfer;
(b) causing the user equipment to transmit a transfer preparation command including the operator-transfer temporary number to the embedded subscriber identification module;
(c) causing the user equipment to transmit a transfer request including the operator-transfer temporary number to the subscriber server;
(d) causing the subscriber server to transmit a user-authentication transfer-setup request including the operator-transfer temporary number to the embedded subscriber identification module; and
(e) causing the embedded subscriber identification module to authenticate the operator-transfer temporary number, based on the operator-transfer temporary number acquired in the step (b) and the operator-transfer temporary number acquired in the step (d).

9. A transfer authentication method of verifying a transfer of an operator of user equipment from a first operator to a second operator using
- an embedded subscriber identification module that is a subscriber identification module embedded in the user equipment,
- a first subscriber server managed by the first operator, and
- a second subscriber server managed by the second operator,
- the method comprising the steps of:
- (a) causing the first subscriber server to transmit a transfer request including a subscriber identifier associated with the user equipment to the second subscriber server;
- (b) causing the second subscriber server to transmit a response including a new subscriber identifier for identifying the user equipment in the second operator to the first subscriber server; and
- (c) causing the first subscriber server to transmit a user-authentication transfer-setup request including the new subscriber identifier to the embedded subscriber identification module.

* * * * *